United States Patent [19]

Wenzl et al.

[11] Patent Number: 5,674,396
[45] Date of Patent: Oct. 7, 1997

[54] ROTARY FILTER WITH A DEVICE FOR SEPARATING A SOLIDS/LIQUID MIXTURE, PARTICULARLY A PULP SUSPENSION

[75] Inventors: Franz Wenzl, Attendorfberg; Wolf Sacherer, Schaftal, both of Austria

[73] Assignee: Andritz-Patentverwaltungs-Gesellschaft m.b.H., Graz, Austria

[21] Appl. No.: 571,258

[22] Filed: Dec. 12, 1995

[30] Foreign Application Priority Data

Dec. 13, 1994 [AT] Austria ........................... 2320/94

[51] Int. Cl.⁶ .................................................. B01D 33/06
[52] U.S. Cl. ........................ 210/324; 210/331; 210/332; 210/402; 210/404; 210/406; 210/408
[58] Field of Search ............................ 210/107, 116, 210/98, 138, 324, 331, 332, 402, 404, 406, 408

[56] References Cited

U.S. PATENT DOCUMENTS

| | | |
|---|---|---|
| 3,471,026 | 10/1969 | Riker . |
| 3,591,009 | 7/1971 | Luthi et al. ........................... 210/331 |
| 3,724,668 | 4/1973 | Ahlquist ............................... 210/331 |
| 5,053,123 | 10/1991 | Clarke-Pounder et al. . |
| 5,503,737 | 4/1996 | Luthi .................................. 210/138 |

*Primary Examiner*—Peter A. Hruskoci
*Assistant Examiner*—Betsey J. Morrison
*Attorney, Agent, or Firm*—Chilton, Alix & Van Kirk

[57] ABSTRACT

The invention refers to a rotary filter with a device for separating a liquid-solid mixture, particularly a pulp suspension, with several separate zones, at least one of which is of variable design. It is mainly characterized by the variable design for the length and/or position of the atmospheric zone and the vacuum zone.

8 Claims, 5 Drawing Sheets

ROTARY FILTER WITH A DEVICE FOR SEPARATING A SOLIDS/LIQUID MIXTURE, PARTICULARLY A PULP SUSPENSION

BACKGROUND OF THE INVENTION

The invention concerns a rotary filter with a device for separating a solids/liquid mixture, particularly a pulp suspension, with several zones, including an atmospheric zone and a vacuum zone at least one of which is of variable design.

The rotary filters already known, which are used particularly for recovery of fibers and for stock thickening in the paper industry, are very difficult to optimize if there is a change in the suspension to be dewatered. To do this it is usually necessary to remove the control valve (also referred to as the control head) and install a new, modified control disc. The design of the control disc is based on previous experience with similar suspensions, with the result that, in most cases, such work fell short of being sufficient as regards reaching the optimum operating mode.

U.S. Pat. No. 3,471,026, "Continuous Rotary Disc Filters", generally describes the operation of the type of filter with which the present invention is concerned. U.S. Pat. No. 5,053,123, "Adjustable Valve For Varying Filtrate Composition From Filters", describes a known control valve for continuous rotary disc filters. The disclosures of U.S. Pat. Nos. 3,471,026 and 5,053,123, are hereby incorporated by reference.

SUMMARY OF THE INVENTION

The aim of the present invention is to achieve an optimum setting of the control zones. Thus, the invention is characterized in that the length and/or position of the atmospheric zone and the vacuum zone are variable. Since these zones are variable, they can be set to an optimum when the filter is started up and then simply be adapted accordingly if there is a change in the properties of the suspension to be dewatered, without having to carry out any lengthy disassembly work on the control head and also without any additional costs for new control discs.

A further development of the invention is characterized in that the length of time in the rotation cycle during which a particular filtrate channel is exposed to the vacuum zone, can be set using a slide gate. By using a slide gate the arc length of the vacuum zone can be set in a simple manner, which also allows optimum setting of the so-called knock-off position for the filter mat adhering to the surface of the filter elements.

An advantageous further development of the invention is characterized in that the slide gate is movable along the control slot for the vacuum zone. If the slide gate is movable along the control slot, it can easily be integrated into the control disc to adjust the angular length or span of the control opening on the control disc, such modification requiring only slight design modifications to the valve head.

A particularly favorable design of the invention is characterized in that the control disc is rotatable and thus, the angular positions, i.e., the centers, of the control openings are variable. By using a rotatable control disc, the optimum limit between the vacuum zone and the atmospheric zone can be set easily. A particularly favorable means of optimizing the individual control zones is created in combination with the adjustable atmospheric zone.

A favorable design of the invention is characterized in that a device to assist discharge of the pulp mat is provided which can be varied to suit the setting of the atmospheric zone as regards length and/or position. Optimum take-off of the pulp mat is achieved at the same time as optimum dewatering by means of a device which can be varied in accordance with the setting of the atmospheric zone to assist take-off of the pulp mat.

A favorable further development of the invention is characterized in that the device contains a shower nozzle for a water jet, particularly a high-pressure water jet. By using a water jet it is particularly easy to determine the point at which the pulp mat is taken off the surface of the filter elements, thus also ensuring efficient take-off.

A favorable design of the invention is characterized in addition by a further zone, used particularly for filtrate discharge, having a variable design. Due to the variable design of a further zone, the rotary filter can be adjusted particularly well to all potential conditions of application without having to make major design modifications.

BRIEF DESCRIPTION OF THE DRAWINGS

In the following the invention is described in more detail using the drawings.

DESCRIPTION OF THE PREFERRED EMBODIMENT

Figure 1:
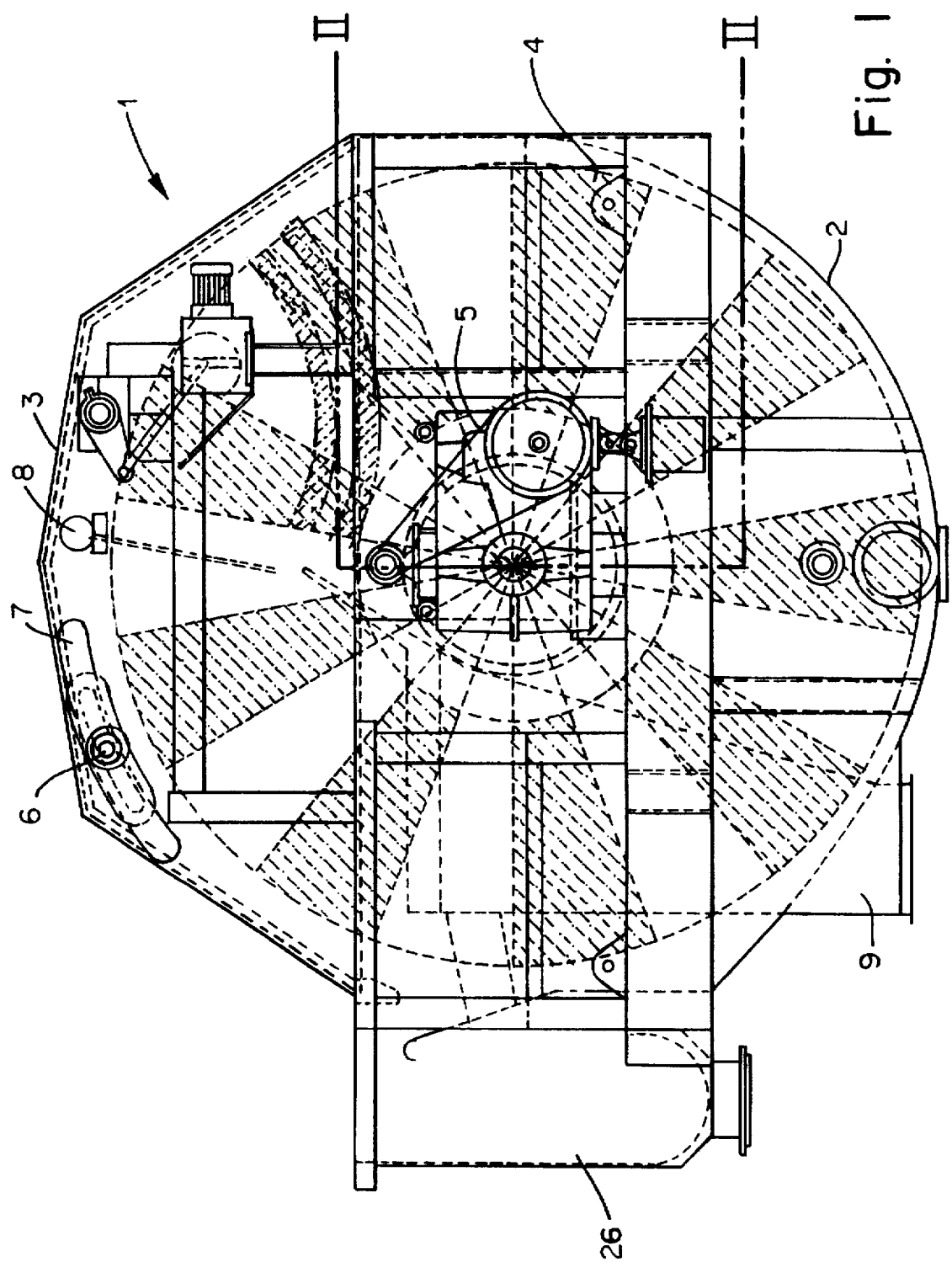
FIG. 1 shows a view of a rotary filter according to the invention.

The drawings show the disc filter preferably used to recover fibers, however, use is also possible in a drum filter. FIG. 1 shows the basic design of the disc filter 1, with the filter vat 2 and a covering hood 3. A number of filter segments 4 are provided. The method of functioning is the same as that of a conventional disc filter, however the filtrate is sucked into the hollow space inside the filter segments 4 and discharged from there through the core 5. Furthermore, the location of the device 6 to assist removal of the pulp mat from the filter segments 4 is also shown. The design of this device allows it be moved along a slot 7. In addition, this illustration shows the showers 8 for cleaning the filter surfaces. The dewatered pulp mat removed from the surface of the filter elements 4 is taken out of the filter housing through a discharge chute 9 and usually fed to a screw conveyor for onward transport. In the various figures, reference number 26 indicates the filter inlet for a liquid-solid mixture, and reference numeral 15 indicates one or more filter outlets for the discharge of filtrate.

Figure 2:
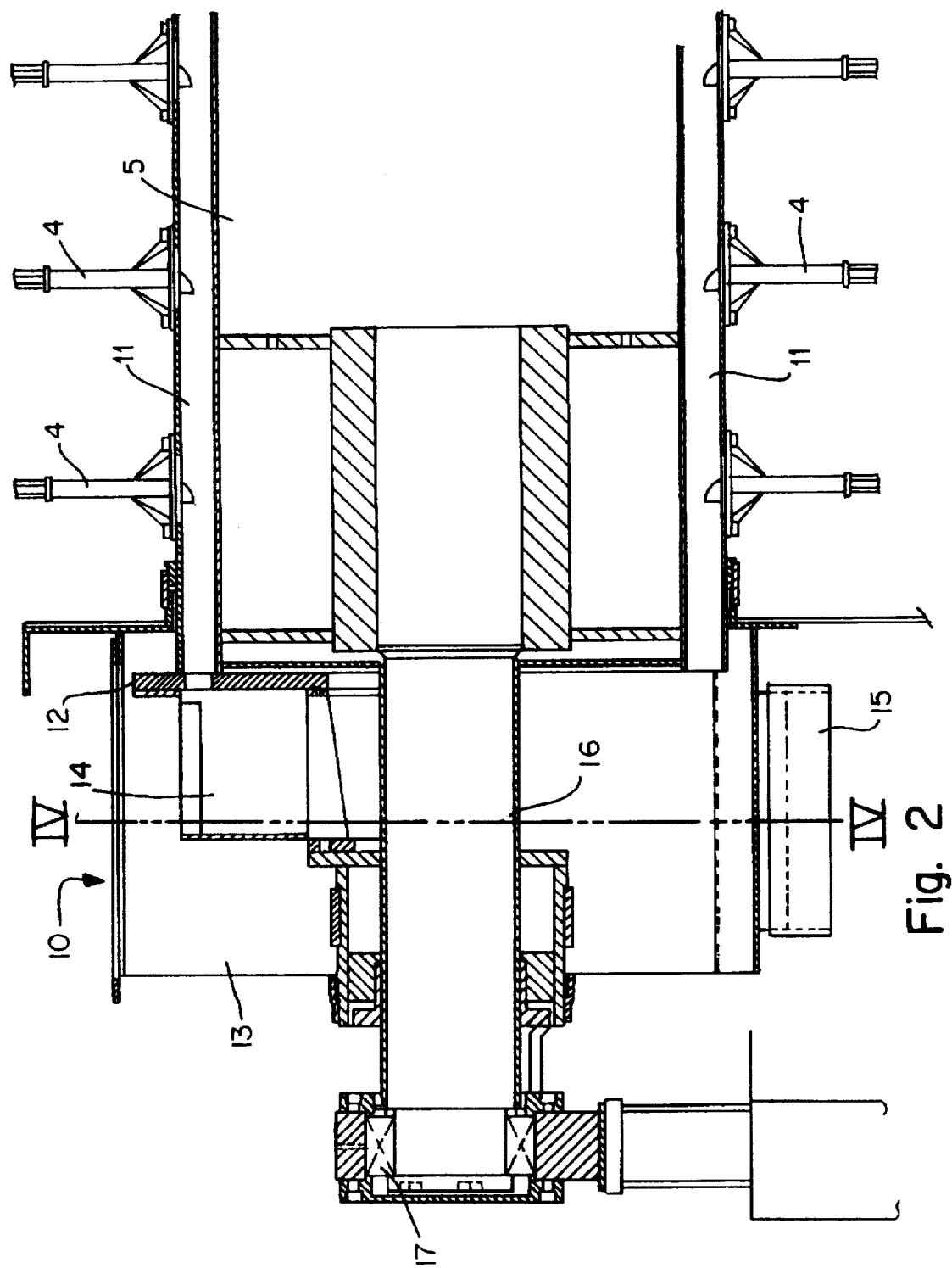
FIG. 2 shows a section through line II—II in FIG. 1.

FIG. 2 shows a longitudinal section through one end of the core, including the valve head. The core 5 illustrated here has several filter discs mounted on it. These filter discs are mounted at certain intervals and are made up of a number of filter elements 4. The filtrate from the hollow spaces inside the individual filter elements 4 is fed into filtrate channels 11 located inside the filter shaft 5. From there, the filtrate is channelled to the valve head 10, where it runs through filtrate branches 15 into the appropriate filtrate pipes. The valve head 10 mainly comprises a wall in the form of a control disc 12, a volume bounded in part by disc 12 and defining a vacuum zone 13, and a volume bounded in part by the control disc 12 and defining an atmospheric zone 14. The center core 5 rotates on a bearing 17 by means of a shaft end 16 which runs through the valve head.

Figure 3:
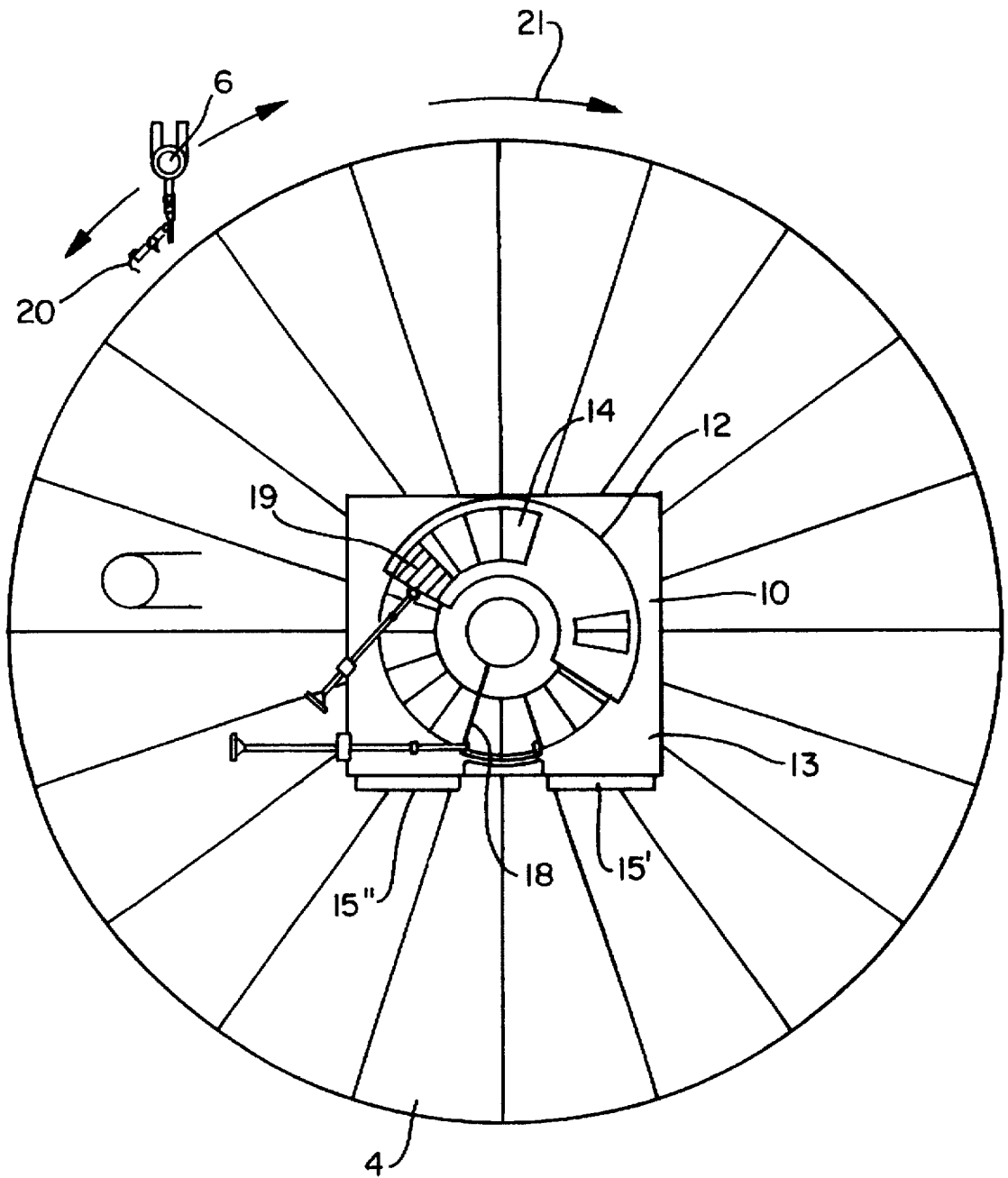
FIG. 3 shows a schematic diagram of the control zones.

FIG. 3 shows a diagram of a rotary filter with the appropriate control zones. The valve head 10 basically comprises a vacuum zone 13 and an atmospheric zone 14. The individual filter elements 4 are rotated in direction 21 past the individual zones of the valve head. Due to a separating device 18 in the filtrate area, the filtrate can be split into cloudy 15' and clear 15" flitrate. Subsequently, the pulp mat which has formed is dried by vacuum and then removed from the surface of the filter elements 4. This figure provides a schematic illustration of the slide gate 19 used to set the length of the atmospheric zone and the vacuum zone. The device 6 to assist removal of the pulp mat and with the shower nozzles 20 provided for this purpose is outlined at the upper half of the circumference.

Figure 4:
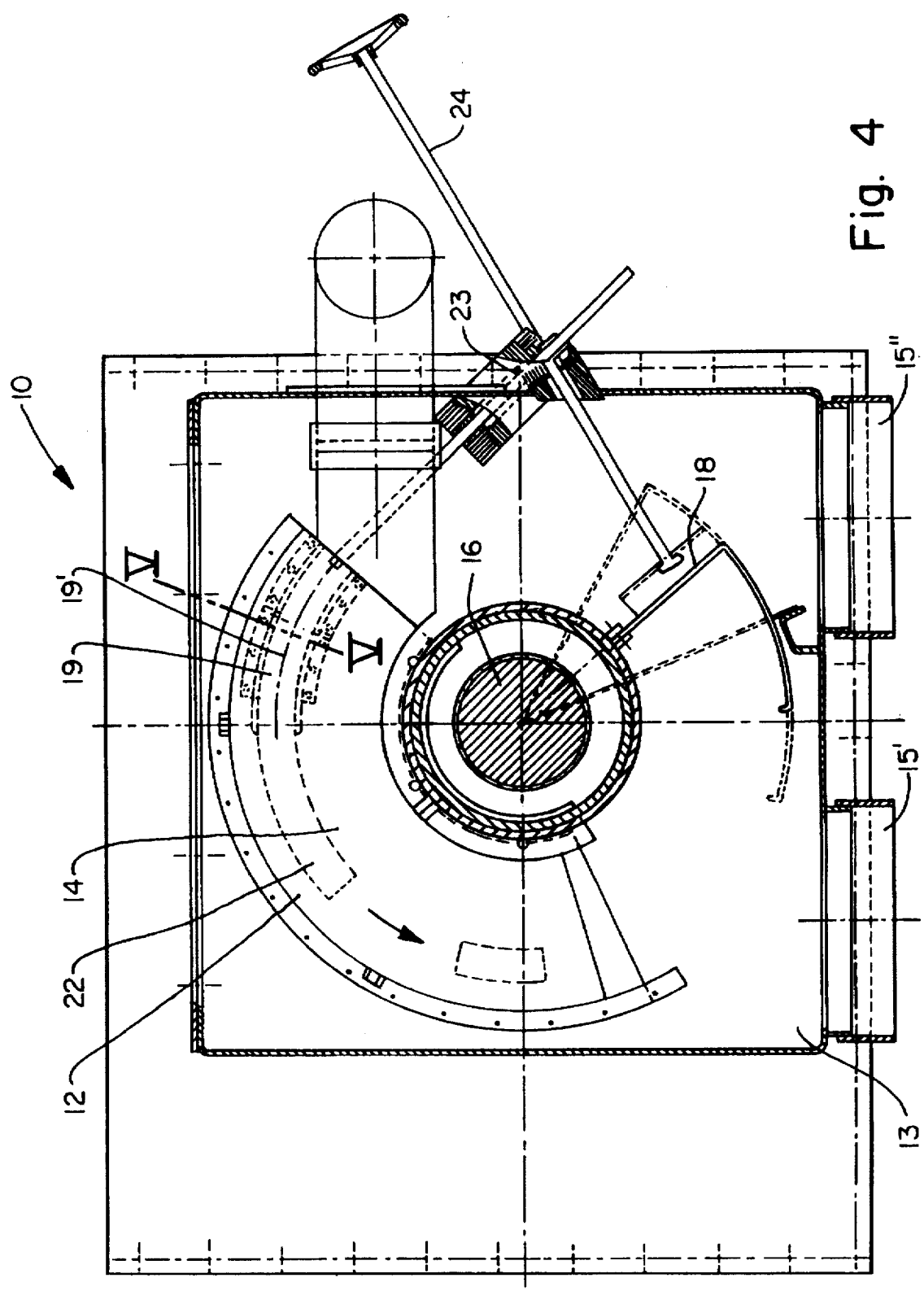
FIG. 4 shows a view of the valve head.

FIG. 4 shows a section as indicated by the line IV—IV in FIG. 2. This section through the valve head 10 shows, in particular, the arrangement of the control disc 12 in the atmospheric zone 14. In this atmospheric zone 14 the control disc 12 has a slot defining a control opening 22 which contains a slide gate 19. FIG. 4 shows two different positions 19 and 19' for the slide gate. The position of the slide gate can be adjusted by using an adjusting spindle 23. Similarly, an adjusting spindle and an appropriate adjusting wheel 24 can be used to adjust the dividing wall 18 between the zones for the cloudy 15' and the clear 15" flitrate.

Figure 5:
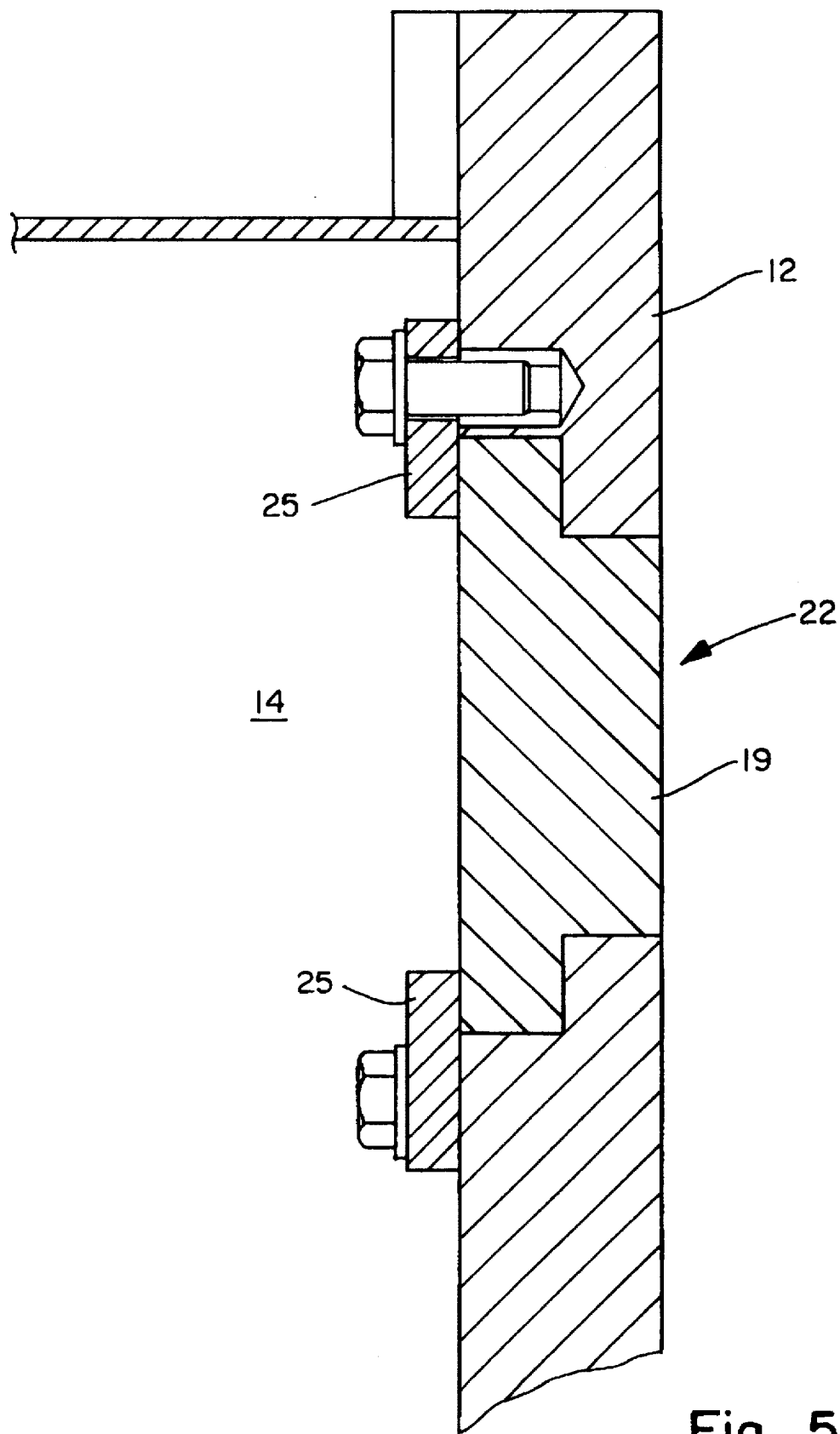
FIG. 5 shows a section through line V—V in FIG. 4.

FIG. 5 shows a section as indicated by the line V—V in FIG. 4 and illustrates in particular the arrangement of the slide gate 19 within the control opening 22 of the control disc 12. In order to guarantee that the slide gate 19 runs accurately, there are guide plates 25 mounted in the control disc 12 on the inside facing the atmospheric zone 14 of the valve head.

The designs shown in the drawings merely illustrate a preferred design of the invention. The invention also covers other designs, e.g., other designs of the slide gate, other adjusting devices for the slide gate and dividing wall inside the filtrate zone or other means of adjusting the device to assist removal of the pulp mat. In addition, a different design could be selected for the center core, as well as for the arrangement and transition of the filter elements 4 to the filtrate pipes. The design of the valve head could also be circular, for example, instead of rectangular.

We claim:

1. A rotary filter having an inlet for a liquid-solid mixture, at least one filter element for separating the liquid-solid mixture into solids and filtrate, a control head in fluid communication with said filter element and having several separate zones including a vacuum zone and an atmospheric zone, at least one of which is variable during operation, and outlet means for discharging filtrate from the filter, wherein the improvement comprises that the control head has a rotatable control disc (12) with control openings which can be varied, whereby the length and/or position of the control opening (22) for the atmospheric zone (14) and the control opening for the vacuum zone (13) can be varied independently of one another.

2. Rotary filter according to claim 1, wherein the length of the control opening for the atmospheric zone (14) can be adjusted using a slide gate (19).

3. Rotary filter according claim 1, wherein a device (6) is provided to assist removal of the pulp mat and that the length and/or position of this device can be varied according to the setting of the atmospheric zone (14).

4. Rotary filter according to 3, wherein the device (6) has a shower nozzle (8) to provide a water jet.

5. Rotary filter according to claim 1, wherein the vacuum zone has sub-zones (15', 15") separated by a divider (18), for collecting cloudy and clear filtrates respectively, and wherein the sub-zones are adjustable by varying the divider during operation.

6. Rotary filter according to claim 4, wherein a slide gate (19) can be moved along the control opening for the atmospheric zone (14).

7. A rotary filter comprising:

a vat;

a core having opposed ends and extending along an axis through said vat, said core carrying a plurality of radially extending filter elements which have means for fluidly communicating with filtrate collection channels in the core;

means for continuously rotating the core;

a control head at one end of the core in fluid communication with the collection channels, for cyclicly exposing each channel to a sequence of vacuum and atmospheric zones, each said zone having an angular span, whereby each filter element is exposed to a corresponding cycle of vacuum and atmospheric pressure as the core rotates;

said control head having, a head wall adjacent said one end of the core and at least one control opening having an angular span which is centered at an angular position such that the opening is in registry for fluid communication with at least one channel, wherein the head wall is in the form of a control disc which is rotatable about said axis, to adjust the angular position of said control opening;

the angular span of one of said vacuum or atmospheric zones overlapping with said control opening for fluid communication with at least one channel; and means for independently adjusting the angular span of said control opening relative to the adjustment of the angular position.

8. The rotary filter of claim 7, wherein the control opening is in the form of an arcuate slot, and gate means are provided in the head wall for adjusting the angular span of said slot.

* * * * *